United States Patent
Huitron et al.

(10) Patent No.: US 10,308,190 B2
(45) Date of Patent: Jun. 4, 2019

(54) RETRACTABLE MIRROR SUPPORT FOR MOBILE DEVICES

(71) Applicant: Ford Global Technologies, LLC, Dearborn, MI (US)

(72) Inventors: Leonardo Alonso Huitron, Naucalpan de Juarez (MX); Edgar Javier Ortega, Tlalnepantla (MX); Allan Alberto Mejia Jaramillo, Atizapan de Zaragoza (MX); Omar Antonio Ramirez Pavon, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/590,506

(22) Filed: May 9, 2017

(65) Prior Publication Data

US 2018/0326920 A1  Nov. 15, 2018

(51) Int. Cl.
| | |
|---|---|
| *B60R 1/12* | (2006.01) |
| *B60R 1/04* | (2006.01) |
| *B60R 11/02* | (2006.01) |
| *B60R 11/00* | (2006.01) |
| *B60J 3/02* | (2006.01) |
| *B60R 1/00* | (2006.01) |

(52) U.S. Cl.
CPC .............. *B60R 11/02* (2013.01); *B60J 3/02* (2013.01); *B60R 1/00* (2013.01); *B60R 2001/1284* (2013.01); *B60R 2011/0033* (2013.01); *B60R 2011/0082* (2013.01)

(58) Field of Classification Search
CPC ........... B60R 1/00; B60R 1/008; B60R 1/081; B60R 11/0241; B60R 11/02; B60R 11/0258; B60R 2011/0033; B60R 2011/0082; B60R 2011/1084; A47G 1/16; H02J 7/025; B60J 3/02; B60J 3/0256
USPC ..... 248/475.1, 481, 495, 314, 917; 359/838, 359/841, 854, 865, 871
See application file for complete search history.

(56) References Cited

U.S. PATENT DOCUMENTS

| | | | | |
|---|---|---|---|---|
| 2,649,028 | A * | 8/1953 | Lenta | B60R 1/081 |
| | | | | 359/854 |
| 5,748,395 | A * | 5/1998 | Rendi, Jr. | B60R 1/008 |
| | | | | 359/841 |
| 6,902,284 | B2 * | 6/2005 | Hutzel | B60R 1/008 |
| | | | | 248/479 |
| 9,819,211 | B2 * | 11/2017 | Vu | H02J 7/025 |
| 2003/0117728 | A1 * | 6/2003 | Hutzel | B60R 1/008 |
| | | | | 359/838 |
| 2011/0080481 | A1 | 4/2011 | Bellingham | |
| 2015/0274088 | A1 | 10/2015 | Minn et al. | |
| 2017/0225628 | A1 * | 8/2017 | Aich | B60R 1/00 |

* cited by examiner

*Primary Examiner* — Tan Le
(74) *Attorney, Agent, or Firm* — Vichit Chea; Brooks Kushman, P.C.

(57) ABSTRACT

A mobile device holder for a rear-view mirror of a vehicle may include a mirror housing, a mobile device bracket arranged on a support, the support arranged at least partially within the mirror housing in a stored position, and a deployment mechanism connected to the support and including a pin configured to rotately hinge the support from the stored position to a deployed position extending out of the housing.

13 Claims, 4 Drawing Sheets

RETRACTABLE MIRROR SUPPORT FOR MOBILE DEVICES

TECHNICAL FIELD

Disclosed herein are retractable mirror support for mobile devices.

BACKGROUND

With an increased use of mobile devices, users are susceptible to becoming distracted, especially during driving. Users may often text, use navigation applications, audio controls, etc. Such distractions may lead to the driver taking his or her focus from the task at hand. Even if a driver is not actively engaging with his or her mobile device, simply handling or holding the device may prevent the driver from affectively maintaining two hands on a steering wheel.

SUMMARY

A mobile device holder for a rear-view mirror of a vehicle may include a mirror housing, a mobile device bracket arranged on a support, the support arranged at least partially within the mirror housing in a stored position, and a deployment mechanism connected to the support and including a pin configured to rotatedly hinge the support from the stored position to a deployed position extending out of the housing.

A mobile device holder for a rear-view mirror of a vehicle may include a mobile device bracket arranged on a support, the support arranged at least partially within a recess defined at a rear of a mirror housing in a stored position, and a deployment mechanism connected to the support and including a pin configured to rotatedly hinge the support from the stored position within the housing to a deployed position extending out of the housing.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle mobile device bracket is disclosed herein. The bracket may be configured to attach to a vehicle rear view mirror and be deployable from a stored position to a deployed position. The bracket may be deployable by hinging a support arm downward. The bracket may include two telescoping arms configured to adjustably engage a mobile device to maintain the mobile device therein.

The bracket allows a user to easily view and interact without losing eye contact with the road. The bracket may be stored during non-use so as to decrease possible obstructions. During use, the bracket may maintain the user device in a convenient, but non-distracting location. The mirror and/or bracket may include a universal serial bus (USB) attachment to easily charge as well as connect the mobile device to the vehicle. This connection may permit download of data and application from the mobile device to the vehicle. This data may include data acquired via the mobile device's camera. In one example, the camera may capture a real-time recording of the front part of the vehicle, similar to a dash camera. In another example, the camera may acquire "selfie" photos of the driver and/or vehicle occupants. The data may be acquired and stored via the SYNC application.

Figure 1:
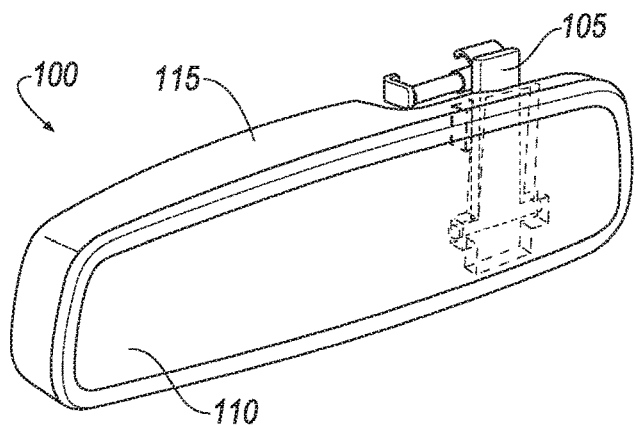
FIG. 1 illustrates an example vehicle rear-view mirror assembly having a mobile device bracket in the stored position.

FIG. 1 illustrates an example vehicle rear-view mirror assembly 100 having a mobile device bracket 105 (not shown in FIG. 1) in the stored position. The rear-view mirror assembly 100 may include a mirror 110 and may extend downward from a vehicle ceiling or roof to provide a mirror image of the area behind the vehicle. The mirror 110 may be arranged in a mirror housing 115. The mirror housing 115 may be made of stamped plastic and may be configured to maintain a deploying mechanism and define a recess (described in more detail with respect to FIG. 4), therein.

Figure 4:
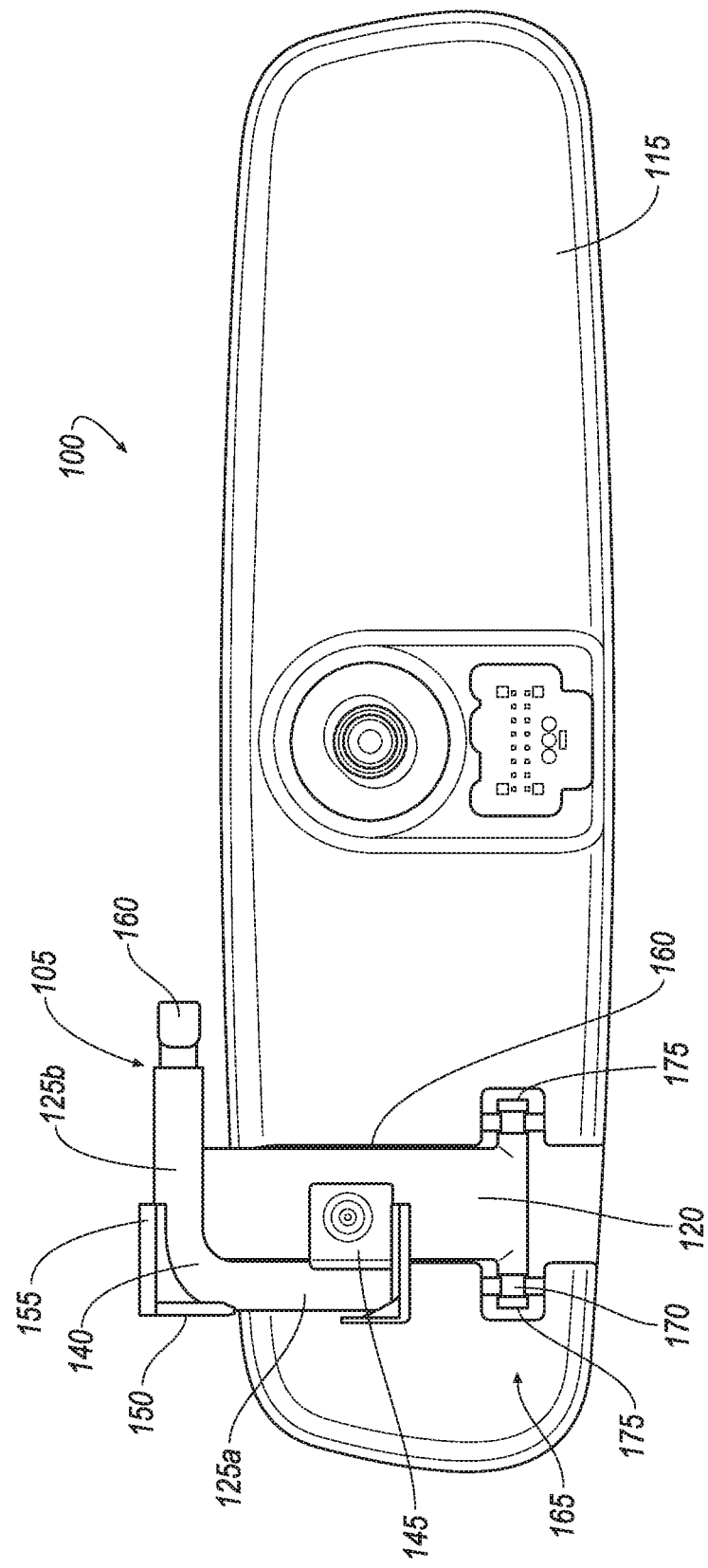
FIG. 4 illustrates a rear view of the vehicle rear-view mirror assembly illustrating the mobile device bracket in the stored position.
Figure 5:
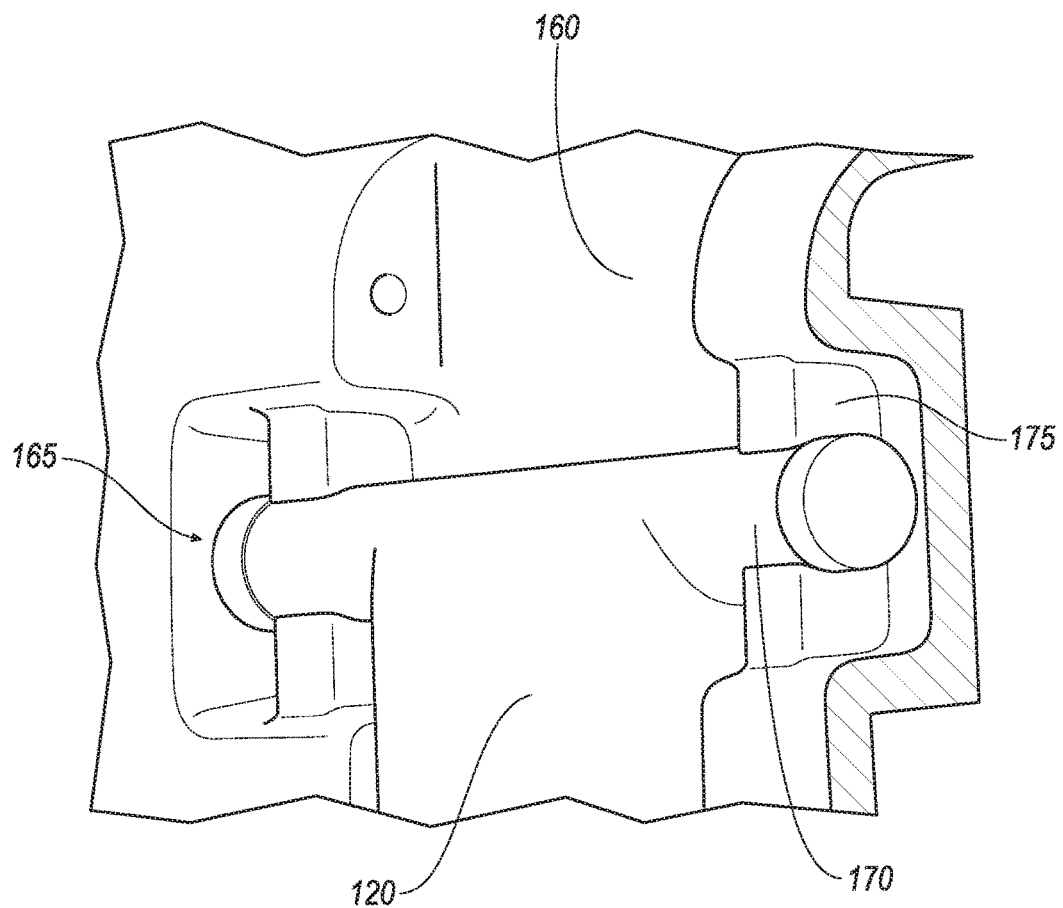
FIG. 5 illustrates a closer view of the deploying mechanism of FIG. 4.
Figure 6:
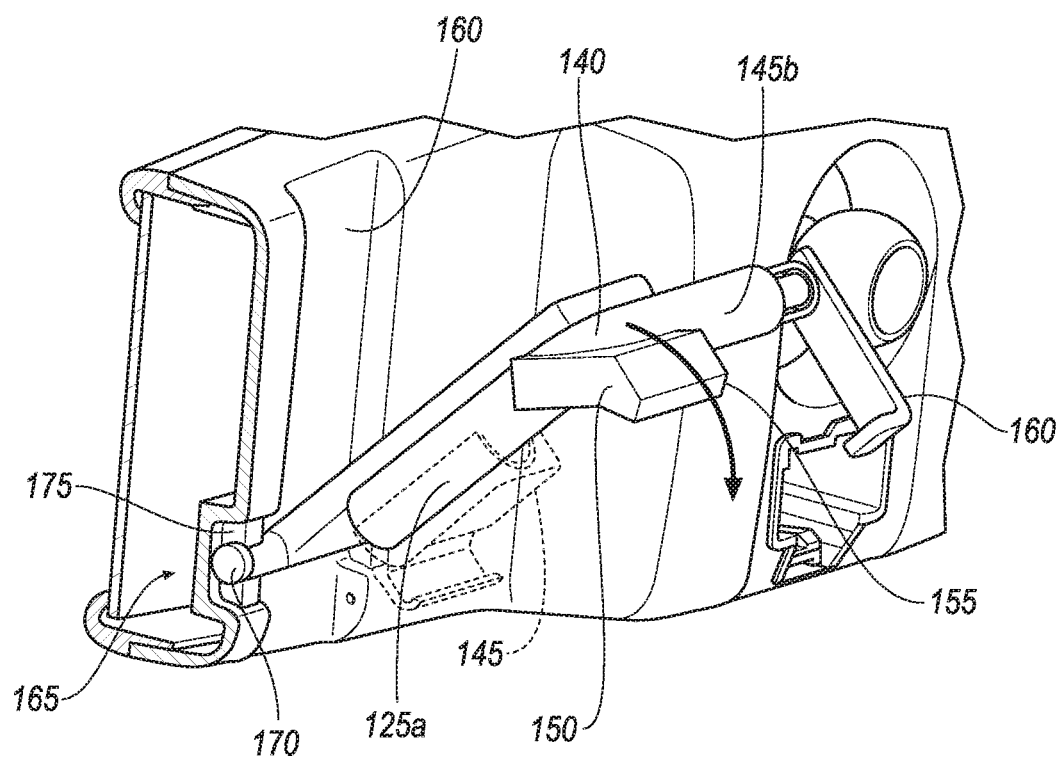
FIG. 6 illustrates a rear view of the rear-view mirror assembly illustrating a bracket in a partially deployed position.

During non-use, the mobile device bracket 105 may be stored in a recess (as shown in FIGS. 4-6). Thus, the mobile device bracket 105 may be out of sight of the driver and other occupants and not provide for any obstruction of the windshield or mirror.

Figure 2:
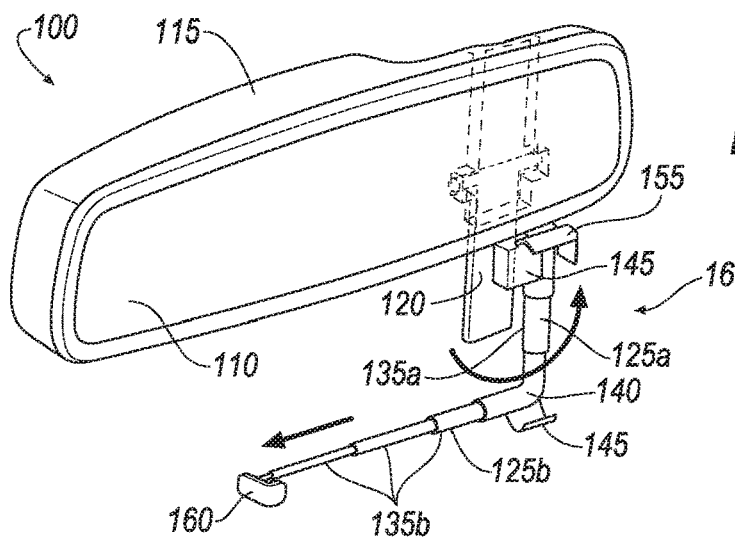
FIG. 2 illustrates an example vehicle rear-view mirror assembly having a mobile device bracket in the deployed position.

FIG. 2 illustrates the example vehicle rear-view mirror assembly 100 having the mobile device bracket 105 in the deployed position. The mobile device bracket 105 may include a support 120 and at least one arm 125 (illustrated as first arm 125a and second arm 125b, and collectively referred to herein as arm 125) arranged on the support 120. The support 120 and the arm 125 may be stored behind the mirror housing 115 in the stored position as shown in FIG. 1, to provide an unobstructed view during non-use.

The arm 125 may include a first arm 125a and a second arm 125b. The first arm 125a may extend parallel with the support 120 and the second arm 125b may extend from and perpendicular to the first arm 125a. Each of the arms 125a, 125b may include a telescoping feature 130 (illustrated as first telescoping feature 135a, 135b and collectively referred to herein as telescoping features 135.) The telescoping feature 135 may include a plurality of tubular parts, each configured to be received by a larger tubular part to decrease the overall length of the arm. Conversely, the overall length of the arm may be increased by a smaller tubular part extending from one of the larger tubular parts.

The telescoping features 135 permit each arm 125a, 125b to have an adjustable length of the respective arm 125a, 125b. This allows for multiple devices having varying lengths and widths to be received by the bracket 105, thus allowing the holder 100 to be customizable and easy to use.

The first arm 125a may be attached to the support 120 at a joint 145. The joint 145 may be arranged mid-way between the ends of the support 120. The joint 145 may maintain an end of the first arm 125a therein. As the support 120 rotates about the deploying mechanism, so does the joint 145 and subsequently the end of the first arm 125a.

Figure 3:
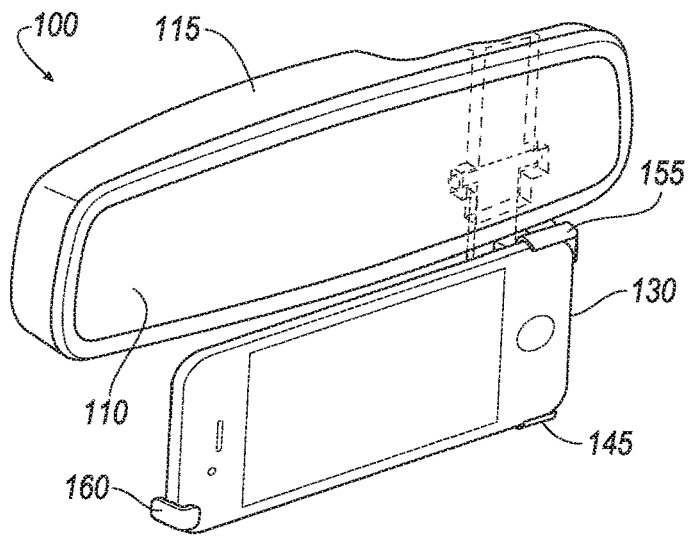
FIG. 3 illustrates an example vehicle rear-view mirror assembly having a mobile device arranged on the mobile device bracket of FIG. 2.

The clamp 145 may be a ball-joint configured for radial movement thereat. The first arm 125a may be radially movable with respect to the support at the joint 145. By permitting the first arm 125a to be radially movable, the angle of the bracket 105 may be adjusted radially. In turn, when the mobile device 130 is maintained within the bracket 105 (as shown in FIG. 3), the angle and orientation of the mobile device 130 may be adjustable. This may permit a user to angle the mobile device 130 in order to best see the mobile device, avoid glare on a screen of the device 130, etc.

Furthermore, the first arm 125a may rotate with respect to the support 120. Such rotation may further permit adjustment of the orientation of the bracket 105. A proximal tubular part of the first arm 125a may be fixed to the joint 145 while a next tubular part may be rotatable within the proximal tubular part to permit the rotation of the first arm 125a.

A first brace 150 may be arranged at the end of the first arm 125a at or near the joint 145. The first brace 150 may be configured to grip a portion of a mobile device 130 arranged therein.

The first arm 125 may join the second arm 125b at a corner junction 140. A second brace 155 may be arranged at the corner junction 140 and may be configured to grip another portion of the mobile device. The first brace 150 and second brace may face each other such that a mobile device may be arranged therein. The first brace 150 may provide an L-shape such that the first brace 150 may be configured to receive a corner of a mobile device. Thus, the first brace 150 may prevent both lateral and vertical movement of the mobile device.

A third brace 160 is arranged at a distal end of the second arm 125b. The third brace 160 may face inward toward the first arm 125a to prevent lateral movement of the mobile device. During use and operation, a user may expand the arms 125a, 125b and place his or her mobile device between the braces 150, 155, 160. The arms 125a, 125b may then be retracted or collapsed to form a tight fit of the braces 150, 155, 160 around the mobile device to secure the mobile device therebetween.

FIG. 3 illustrates the example vehicle rear-view mirror assembly 100 having a mobile device 130 arranged on the mobile device bracket 105 of FIG. 2. The braces 150, 155, 160 may be configured to engage the outer periphery of the mobile device 130 and to maintain the mobile device 130 therebetween. The tension of the arms 125a, 125b may be of sufficient strength to maintain the mobile device 103 within the braces 150, 155, 160 during use without undue movement of the mobile device 130 with respect to the mirror 110. This includes various movements caused by the vehicle such as vibrations caused by driving over rough terrain. That is, the mobile device 130 may maintained an orientation with respect to the mirror. The tension of the arms 125a, 125b may, however, allow the driver, to easily disengage the mobile device 130 from the bracket 105 as well.

The mobile device 130 is illustrated as being a cellular phone herein, though other types of mobile devices such as tablet computers, hand held devices, navigation devices such as global positioning systems (GPS), etc., may be included as the mobile device 130. Once the driver has completed his or her trip, the driver may easily remove the mobile device 130 from the bracket 105 and the bracket 105 may return to a stored position as illustrated in FIG. 1.

FIG. 4 illustrates a rear view of the vehicle rear-view mirror assembly 100 illustrating the mobile device bracket 105 in the stored position. The mirror housing 115 may define a recess 160 configured to receive at least a portion of the support 120. The recess 160 may form a shape similar to that of the support 120, if not slightly larger than the support 120 in order to receive the support 120. The recess 160 may allow the bracket 105 to be stored behind the mirror housing 115 during non-use. The second arm 125b, as well as the first and second braces 150, 155, may extend above the mirror housing 115 in the stored position. The first arm 125a may remain behind the mirror housing 115 but may not be maintained within the recess 160.

Referring to both FIG. 4 and FIG. 5, the recess 160 may maintain the deploying mechanism 165 therein. The deploying mechanism 165 may be configured to hinge the support 120 from the stored position to the deployed position. The deploying mechanism 165 may include a pin 170 fixed and/or integral with the support 120. At least one knuckle 175 may be arranged within the recess to receive a portion of the pin 170. In the example shown in FIG. 4 and FIG. 5, two knuckles 175 are included. The pin 170 may rotate within the knuckles 170, while the knuckles 175 maintain the pin in a fixed location within the recess 160. By permitting the pin 170 to rotate, the support 120 may also move radially with rotations at the pin 170. The support 120 may thus move from within the recess 160, to below the mirror housing in the deployed position.

FIG. 6 illustrates a perspective view of a rear of the mirror assembly illustrating the bracket 105 in a partially deployed position. As explained, the support member 120 may hinge about a pin maintained within the recess 160 via a pair of knuckles 170. The first arm 125a may be connected to the support 120 via the joint 145. The support 120 may be easily movable between the stored position and the deployed position such that a user may easily maneuver the support 120 without undue force.

Accordingly, a built-in mobile device holder is disclosed herein. The mobile device holder may be flexible such that it may fit multiple sizes of devices. The holder may be movable from a stored position arranged behind the rear-view mirror, to a deployed position ready to receive a mobile device and arranged below the rear-view mirror.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mobile device holder for a rear-view mirror of a vehicle, comprising:
   a mirror housing;
   a mobile device bracket including at least one telescoping arm having a brace configured to receive and maintain a mobile device within the bracket, the bracket arranged on a support, the support arranged at least partially within a recess of the mirror housing in a stored position; and a deployment mechanism connected to the support and including a pin configured to hinge the support from the stored position to a deployed position extending out of the housing.

2. The holder of claim 1, wherein the at least one telescoping arm includes a first vertical telescoping arm and a second lateral telescoping arm extending from the first arm.

3. The holder of claim 1, wherein the deploying mechanism includes a pin maintained and rotatable within a knuckle, the pin fixed to the support and configured to move the support radially from the stored position within the mirror housing to a deployed position below the mirror housing.

4. The holder of claim 3, wherein the recess houses the knuckle and the pin.

5. The holder of claim 1, wherein the recess is configured to receive the support in the stored position.

6. The holder of claim 1, wherein the bracket is attached to the support by a joint.

7. The holder of claim 6, wherein the joint is a ball-joint configured to allow radial movement of the bracket with respect to the support.

8. A mobile device holder for a rear-view mirror of a vehicle, comprising:

a bracket having a telescoping arm including at least one brace configured to receive and maintain a mobile device, the bracket arranged on a support, the support arranged at least partially within a recess defined at a rear of a mirror housing in a stored position, and a deployment mechanism connected to the support and including a pin configured to rotatedly hinge the support from the stored position within the housing to a deployed position extending out of the housing, wherein the deploying mechanism includes a pin maintained and rotatable within a knuckled, the pin fixed to the support and configured to move the support radially from the stored position within the mirror housing to a deployed position below the mirror housing.

9. The holder of claim 8, wherein the telescoping arm includes a first vertical telescoping arm and a second lateral telescoping arm extending from the first arm.

10. The holder of claim 8, wherein the recess houses the knuckle and the pin.

11. The holder of claim 8, wherein the recess is configured to receive the support in the stored position.

12. The holder of claim 8, wherein the bracket is attached to the support by a joint.

13. The holder of claim 12, wherein the joint is a ball-joint configured to allow radial movement of the bracket with respect to the support.

* * * * *